Nov. 6, 1956 R. M. BECK 2,769,680

GRAPH PLOTTER

Filed June 11, 1953 2 Sheets-Sheet 1

INVENTOR.
ROBERT M. BECK
BY Herbert E. Metcalf
ATTORNEY

| COUNT | LEFT TUBE IN MULTI-VIBRATOR-12 | LEFT TUBE IN MULTI-VIBRATOR-18 | LEFT TUBE IN MULTI-VIBRATOR-24 | LEFT TUBE IN MULTI-VIBRATOR-30 |
|---|---|---|---|---|
| 0 | L | L | L | L |
| 1 | H | L | L | L |
| 2 | L | H | L | L |
| 3 | H | H | L | L |
| 4 | L | L | H | L |
| 5 | H | L | H | L |
| 6 | L | H | H | L |
| 7 | H | H | H | L |
| 8 | L | L | L | H |
| 9 | H | L | L | H |
| 10 | L | H | L | H |
| 11 | H | H | L | H |
| 12 | L | L | H | H |
| 13 | H | L | H | H |
| 14 | L | H | H | H |
| 15 | H | H | H | H |
FIG. 4
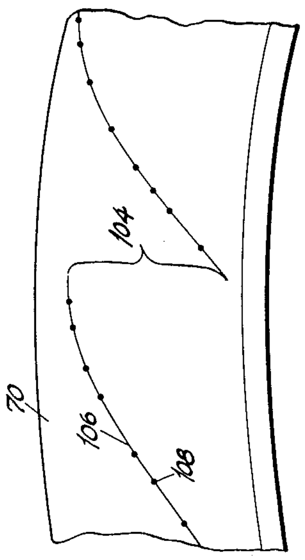
FIG. 3
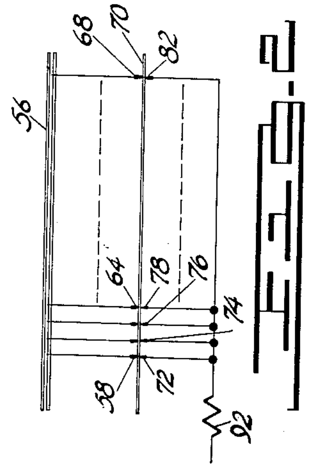
FIG. 2
INVENTOR.
ROBERT M. BECK
BY
Herbert E. Metcalf
ATTORNEY 2,769,680

GRAPH PLOTTER

Robert M. Beck, Inglewood, Calif., assignor to Northrop Aircraft, Incorporated, Hawthorne, Calif., a corporation of California Application June 11, 1953, Serial No. 361,027

8 Claims. (Cl. 346—49)

This invention relates to graph plotters and more particularly to a graph plotter which operates simply and reliably to produce a record of a mathematical relationship on electrosensitive paper.

In recent years, much progress has been made in the development of electronic digital computers to solve mathematical problems. As a result of the work that has been performed, the development of satisfactory computors appears to be further advanced than the development of apparatus associated with the computers. Such associated apparatus includes equipment for introducing information into the computer to control the operation of the computer and equipment for receiving information from the computer and providing a record of such information. The development of such input and output equipment has been retarded in spite of the considerable effort that has been devoted to such development.

This invention provides apparatus for recording the relationship between two digital quantities. The apparatus is operative to provide an indication of the value of one of quantities at all times and to provide an indication of each increment in the value of the second quantity. The apparatus provides indications of the digital quantities by energizing wires positioned to provide graphical representations of numerical values. When a wire is energized, a mark is placed on an electrosensitive paper to record the value represented by the wire. The apparatus operates simply and reliably to provide numerical indications over a relatively wide range of values.

An object of this invention is to provide apparatus for graphically plotting the relationship between two digital quantities.

Another object is to provide apparatus of the above character having a plurality of wires positioned along an axis in accordance with the different numerical values that they represent so as to provide an indication of the different values of a first quantity.

A further object is to provide apparatus of the above character for varying the intensity of the marks produced by the wires to provide an indication of each increment in the value of a second quantity related to the first quantity.

Still another object is to provide apparatus of the above character utilizing electrosensitive paper upon which marks are recorded to provide a graphic representation of the relationship between two digital quantities.

A still further object is to provide apparatus of the above character which is relatively simple in construction and straightforward and reliable in operation over a wide range of digital values.

Other objects and advantages will be apparent from a detailed description of the invention and from the appended drawings and claims.

In the drawings:

Figure 2 is a sectional view taken substantially on the line 2—2 of Figure 1;

Figure 3 is a plan view illustrating somewhat schematically the appearance of the graphical representation provided by the apparatus shown in Figures 1 and 2; and Figure 4 is a chart illustrating the operation of certain of the components shown in Figure 1.

Figure 1:
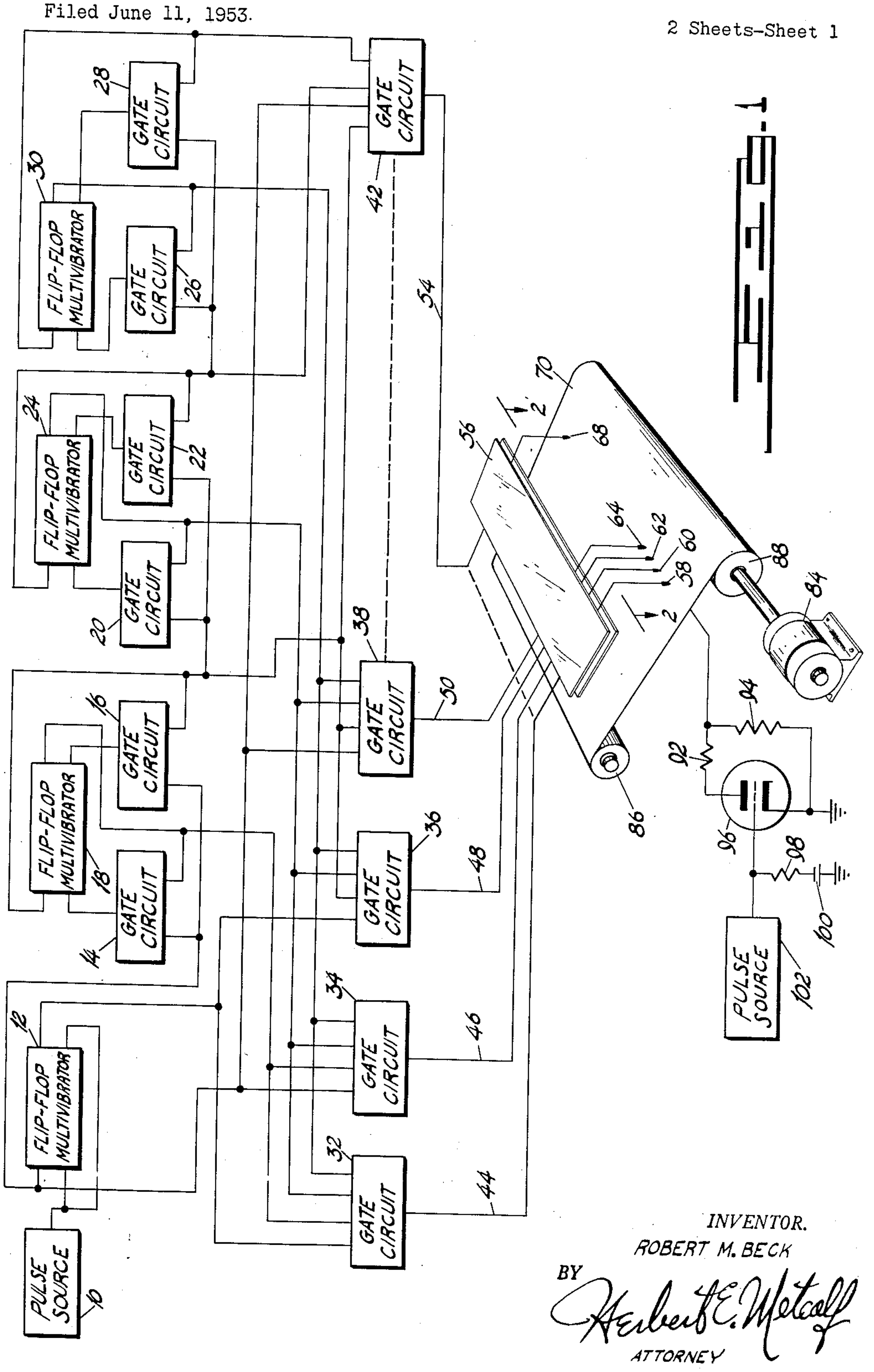
Figure 1 is a somewhat schematic diagram, partly in block form and partly in perspective, illustrating one embodiment of the invention.

In one embodiment of the invention, a pulse source 10 (Figure 1) is adapted to provide a plurality of pulses indicative of the increments in the value of a dependent quantity $y$. The output from the pulse source 10 is introduced to the grids of the left and right tubes in a flap-flop multivibrator 12. The multivibrator 12 may be constructed in accordance with the principles outlined on pages 586 to 589, inclusive, of "Radio Engineering" (3rd edition, 1947) by Frederick E. Terman.

Connections are made from the plate of the left tube in the multivibrator 12 to input terminals of gate circuits 14 and 16. Voltages are also applied to input terminals of the gate circuits 14 and 16 from the plates of the right and left tubes, respectively, in a flip-flop multivibrator 18. The output from the gate circuits 14 and 16 are respectively applied to the grids of the left and right tubes in the multivibrator 18.

In addition to being connected to the gate circuit 16, the plate of the left tube in the multivibrator 18 is connected to input terminals of gate circuits 20 and 22. Connections are also respectively made to input terminals of the gate circuits 20 and 22 from the plates of the right and left tubes in a multivibrator 24. Output signals from the gate circuits 20 and 22 are applied to the grids of the left and right tubes, respectively, in the multivibrator 24.

The voltage on the plate of the left tube in the multivibrator 24 is applied to the input terminals of gate circuits 26 and 28 as well as to an input terminal of the gate circuit 22. A second input terminal of the gate circuit 26 is connected to the plate of the right tube in a flip-flop multivibrator 30. Similarly, a second input terminal of the gate circuit 28 has voltage applied to it from the plate of the left tube in the multivibrator 30. Connections are respectively made from the output terminals of the gate circuits 26 and 28 to the grids of the left and right tubes in the multivibrator 30.

The gate circuits 14, 16, 20, 22, 26 and 28 may be formed from a plurality of diodes which are so connected that a signal cannot pass through one of the gate circuits until the voltages on all of the input terminals are simultaneously high. These gate circuits are known in computer terminology as "and" circuits. Circuits similar to those disclosed above are shown in Figures 29 to 33, inclusive of co-pending application Serial No. 217,478 filed March 26, 1951, by Collison and Steele.

The plates of the right tubes in the multivibrators 12, 18, 24 and 30 are connected to the input terminals of a gate circuit 32. Similarly, connections are made to input terminals of a gate circuit 34 from the plate of the left tube in the multivibrator 12 and from the plates of the right tubes in the multivibrators 18, 24 and 30.

Input terminals of a gate circuit 36 are adapted to receive voltages from the plate of the left tube in the multivibrator 18 and the plates of the right tubes in the multivibrators 12, 24 and 30. Voltages are applied to input terminals of a gate circuit 38 from the plates of the left tubes in the multivibrators 12 and 18 and from the plates of the right tubes in the multivibrators 24 and 30.

As will be disclosed in detail hereinafter, the gate circuits 32, 34, 36 and 38 are adapted to provide indications of the integers "0," "1," "2" and "3," respectively, because of their particular connections to the multivibrators 12, 18, 24 and 30. Other gate circuits may be provided to provide indications of successive integers between "4" and "15." Since the connections to the gate circuits to obtain such indications are well known, only a gate circuit 42 providing an indication of the integer "15" is shown. The gate circuit 42 receives voltages from the plates of the left tubes in the multivibrators 12, 18, 24 and 30.

Each of the gate circuits 32, 34, 36, 38 and 42 operates as an "and" circuit to pass a signal only when relatively high voltages are simultaneously introduced to all of its input terminals. The gate circuits are constructed in a manner similar to that shown in Figures 25 and 26 of co-pending application Serial No. 217,478 to provide indications of different integers.

Output leads 44, 46, 48, 50 and 54 extend from the gate circuits 32, 34, 36, 38 and 42, respectively. The output leads are supported at one end between a pair of laminated glass plates 56. Terminals 58, 60, 62, 64 and 68 are disposed at the end of the leads 44, 46, 48, 50 and 54, respectively and are positioned to rest on the upper surface of an electrosensitive paper 70.

The terminals 58, 60, 62, 64 and 68 are separated from one another by distances corresponding to the numerical values which they represent. Thus the terminal 58 is positioned at one end of the paper to represent the integer "0" and the terminal 68 is positioned at the other end of the paper to represent the integer "15." Terminals 72 (Figure 2), 74, 76, 78 and 82 are positioned below the paper 70 in substantially vertical alignment with the terminals 58, 60, 62, 64 and 68, respectively. The terminals 72, 74, 76, 78 and 82 are electrically connected to one another.

One type of electrosensitive paper 70 that may be used is designated as "Alfax" and is manufactured by the Alfax Paper and Engineering Company of Westboro, Massachusetts. The paper 70 is adapted to be driven past the terminals 58, 60, 62, 64 and 68 by a suitable motor 84 at a relatively constant speed. The paper is adapted to be unwound from a drum 86 (Figure 1) and wound on a drum 88.

The terminals 72, 74, 76, 78 and 82 are electrically connected to a resistance 92 having a relatively low value and to a grounded resistance 94 having a relatively high value. The resistance 92 is in turn connected to the plate of a tube 96 having its cathode grounded. The grid of the tube 96 is negatively biased by a resistance 98 in series with a suitable battery 100, the positive terminal of which is grounded. The grid of the tube 96 is also adapted to receive pulses from a pulse source 102 which provides pulses to indicate successive increments in the value of an independent quantity $x$.

The left tubes in the multivibrators 12, 18, 24 and 30 are normally conductive, and the right tubes in the multivibrators are normally cut off. Upon the introduction of a first pulse from the source 10 to the grid of the left tube in the multivibrator 12, the left tube in the multivibrator becomes cut off. Because of the inherent operation of multivibrators such as the multivibrator 12, the right tube in the multivibrator 12 becomes conductive when the left tube becomes cut off.

It should be appreciated that the pulses from the source 10 may be either negative or positive. When a negative pulse is introduced to the conductive tube in a multivibrator, the tube becomes cut off upon the occurrence of the leading edge of the pulse. Upon the introduction of the trailing edge of a positive pulse, the conductive tube in a multivibrator is triggered into a state of non-conductivity.

When a second pulse is introduced from the source 10, the right tube in the multivibrator 12 becomes cut off and the left tube starts to conduct. The resultant flow of current through the left tube in the multivibrator 12 causes the voltage on the plate of the tube to become relatively low such that a negative pulse of voltage is produced upon the plate of the tube.

During the time that the left tube in the multivibrator 12 is cut off, relatively high voltages are simultaneously introduced to the gate circuit 14 from the plate of the left tube in the multivibrator 12 and the plate of the right tube in the multivibrator 18. Upon the introduction of the second pulse from the source 10, the voltage on the plate of the left tube in the multivibrator 12 becomes relatively low. Since the gate circuit 14 no longer has relatively high voltages introduced to both of its input terminals, the gate circuit operates to pass a signal to the grid of the left tube in the multivibrator 18. This signal triggers the left tube in the multivibrator 18 into a state of non-conductivity and causes the right tube to start conducting.

Upon the introduction of a third pulse from the source 10, the left tube in the multivibrator 12 becomes cut off and the right tube starts to conduct. A fourth pulse from the source 10 causes the right tube in the multivibrator 12 to become cut off and the left tube to start to conduct. In this way, the left and right tubes in the multivibrator 12 become triggered into a state of non-conductivity upon the introduction of alternate pulses from the source 10. This is illustrated in the chart shown in Figure 4. In this chart, a relatively high voltage on the plate of the left tube in the multivibrator 12 is designated by the letter "H" and a relatively low voltage is designated by the letter "L."

During the time that a count of "3" is being indicated, the voltages on the plates of the left tubes in the multivibrators 12 and 18 are relatively high. This causes relatively high voltages to be simultaneously introduced to both of the input terminals in the gate circuit 16. Upon the introduction of the fourth signal from the source 10, the left tube in the multivibrator 12 becomes conductive and a relatively low voltage is produced on its plate. Since the gate circuit 16 no longer has positive voltages introduced to both of its terminals, a signal passes through the gate circuit 16. This signal triggers the right tube in the multivibrator 18 into a state of non-conductivity and causes the left tube in the multivibrator to become conductive.

The left tube in the multivibrator 18 remains conductive until the left tube in the multivibrator 12 again becomes triggered from a state of non-conductivity to a state of conductivity. In like manner, the left and right tubes in the multivibrator 18 become alternately conductive every time that the left tube in the multivibrator 12 is triggered from a state of non-conductivity to a state of conductivity. Since the left tube in the multivibrator 12 is triggered into a state of conductivity upon the introduction of alternate pulses, the left tube in the multivibrator 18 becomes triggered into a state of conductivity upon the introduction of every fourth signal.

The multivibrator 24 operates in a similar manner to that disclosed above for the multivibrators 12 and 18. As a result of its operation, the left tube in the multivibrator 24 is triggered into a state of non-conductivity when the voltage on the plate of the left tube in the multivibrator 18 becomes relatively low at a count of "4." At a counter of "8," the right tube in the multivibrator 24 becomes triggered into a state of non-conductivity because of the introduction of a relatively low voltage from the plate of the left tube in the multivibrator 18 to the gate circuit 22.

Because of the connections to the gate circuits 20 and 22, the left tube in the multivibrator 24 becomes cut off after the introduction of every eight pulses from the source 10. The multivibrator 30 also operates in a similar manner to the multivibrators 12, 18 and 24. Because of its operation, the left tube in the multivibrator 30 becomes cut off upon the introduction of 16 pulses and every multiple thereof.

As will be seen in Figure 4, the multivibrators 12, 18, 24 and 30 operate in a pattern to provide an indication of every number between "0" and "15." Since the multivibrators 12, 18, 24 and 30 have a different pattern of operation for each integer between "0" and "15," they may be connected in different arrangements to provide indications of the successive integers. For example, the gate circuit 32 is connected to pass a signal when the plates of the right tubes in the multivibrators 12, 18, 24 and 30 are simultaneously high. As may be seen in Figure 4, this pattern corresponds to the value "0." Similarly, the gate circuits 34, 36 and 38 are connected to produce relatively high voltages on their output terminals for the integers "1," "2" and "3" respectively. The gate circuit 42 receives voltages from the plates of the left tubes in the multivibrators 12, 18, 24 and 30 to produce a relatively high output voltage for the integer "15."

At any instant, a relatively high voltage is produced on one of the leads corresponding to the leads 44, 46, 48, 50 and 54. The particular lead that is energized is dependent upon the numerical count in the multivibrators 12, 18, 24 and 30. For example, when a count of "2" is obtained, a relatively high voltage is produced on the lead 48.

When a relatively high voltage is produced on a lead, current flows through a circuit which includes the gate circuit associated with the lead, the terminals associated with the lead, the electrosensitive paper 70 and the resistance 94. This current causes a mark to be permanently recorded on the paper. For example, for an indication of "2," current flows through the gate circuit 36, the lead 48, the terminal 62, the paper 70, the terminal 76 and the resistance 94. This current causes a mark to be recorded on the paper 70 at a position corresponding to the terminals 62 and 76. Because of its relative positioning along the width of the paper, the mark provides an indication of the integer "2."

Similarly, for an indication of "15," current flows through a circuit including the gate circuit 42, the lead 54, the terminal 68, the paper 70, the terminal 82 and the resistance 94. The mark recorded on the paper 70 by this current is at a position along the width of the paper corresponding to the value "15." In this way, the count of pulses emanating from the source 10 is recorded on the paper 70 at every instant as the paper is driven by the motor 84 past the terminals.

Since a relatively high voltage is produced in every instant on one of the leads corresponding to the leads 44, 46, 48, 50 and 54, current flows through the paper 70 to provide a continuous indication of the number of pulses emanating from the source 10. The current flow is of a relatively moderate value because of the considerable value of the resistance 94. This causes a mark of moderate intensity to be recorded on the paper 70.

Upon a count of "15" in the multivibrators 12, 18, 24 and 30, relatively high voltages are produced on the plates of the left tubes in the multivibrators 12, 18, 24 and 30. When the next pulse is introduced from the source 10, the right tube in each of the multivibrators 12, 18, 24 and 30 is triggered into a state of non-conductivity indicative of the value "0." In this way, the multivibrators return to their original condition upon each count of "16" and every multiple thereof.

Since indications are provided on the paper 70 in accordance with the count obtained at any instant by the multivibrators 12, 18, 24 and 30, sharp breaks are produced in the curve recorded upon the paper 70 every time that a count of "16" or a multiple thereof is completed. For example, a break 104 (Figure 3) may be provided in a curve 106 recorded on the paper 70 to indicate the quantity $y$ at any instant. In general it is known that such breaks do not actually constitute the shape of the curve that is being plotted. Because of this, interpolations can be made to obtain the cumulative value of the quantity $y$ at any instant.

It should be appreciated that the multivibrators 12, 18, 24 and 30 are connected in Figure 1 to indicate only a positive accumulation of increments in the quantity $y$. Such connections have been made for purposes of simplicity and convenience. Actually, the quantity $y$ may at times decrease in value and may sometimes even become negative. In co-pending application Serial No. 217,478, a plurality of multivibrators are shown as being connected together to provide an accurate indication of a plurality of positive and negative increments. The indication provided by the multivibrators includes both the magnitude and the polarity of the cumulative value of the increments. Such an arrangement of multivibrators may be easily adapted for use in conjunction with the apparatus disclosed above.

Just as the source 10 provides a pulse upon each increment in the value of a first quantity $y$, the source 102 provides a pulse every time that an increment occurs in the value of a second quantity $x$ related to the quantity $y$. Each pulse from the source 102 preferably has a positive polarity. When a pulse from the source 102 is introduced to the grid of the normally non-conductive tube 96, it causes the tube to become conductive. Current then flows through a circuit including one of the gate circuits corresponding to the gate circuit 32, the upper terminal associated with the gate circuit, the electrosensitive paper 70, the lower terminal associated with the gate circuit, the resistance 92 and the tube 96. The particular gate circuit through which the current flows is dependent upon the count of pulses provided for the quantity $y$ in the multivibrators 12, 18, 24 and 30.

Since the total impedance provided by the resistance 92 and the tube 96 is less than that provided by the resistance 94, the current flowing through the resistance 92 and the tube 96 is greater than that which normally flows through the resistance 94. This causes a relatively dark spot to be recorded on the graph when the tube 96 becomes conductive so as to provide an indication that a $dx$ increment has occurred. For example, a spot 108 may be recorded on the paper 70 between the terminals 62 and 76 when an increment in the quantity $x$ is obtained at the time that an indication of the integer "2" is provided by the multivibrators 12, 18, 24 and 30. In this way, increments in the quantity $x$ can be easily recognized on the paper 70.

The apparatus disclosed above has several important advantages. It provides a permanent and accurate record of the relationship between two quantities with the utilization of a minimum number of components. For example, a minimum number of multivibrators are required to provide an indication in the cumulative value of the quantity $y$ at any instant. A minimum number of multivibrators are required because of the interpolation which may be made in the sharp breaks in the curve plotted on the paper 70 when a full count is obtained in the multivibrators.

By utilizing a plurality of terminals separated along one axis of the paper 70 by distances corresponding to the respective values which they represent, an accurate and reliable indication is provided in the dependent quantity $y$. The use of a plurality of terminals is also advantageous in that a minimum number of components such as the resistance 94 is required. The use of the terminals and the components associated with the terminals is also advantageous since their operation is independent of variations in such parameters as voltages from power supplies.

Accurate and reliable indications of increments in the dependent quantity $x$ are also provided by the apparatus disclosed above. Since relatively dark spots similar to the spot 108 are recorded on the paper to indicate such increments, these increments can be easily ascertained. The increments are recorded on the paper by the utilization of a minimum number of components such as the resistance 92 and the tube 96. The operation of such components is also independent of variations in parameters such as voltages from power supplies.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A graph plotter, including, means for providing digital increments in a first quantity, means for providing a count of digital increments in a second quantity related to the first quantity, an electrosensitive paper, a plurality of terminals disposed in contiguous relationship to the paper, each of the terminals being connected to the counting means to become energized upon a count representing a different integer so as to produce a mark upon the paper, and means for producing a change in the intensity of the marks provided by the terminals upon each digital increment in the first quantity.

2. A graph plotter, including, means for providing digital increments in a first quantity, means for providing digital increments in a second quantity related to the first quantity, means for providing a count of the increments in the second quantity, an electrosensitive paper, a plurality of terminals disposed in contact with the paper at progressive intervals along a first axis to provide indications on the paper upon the energization of each terminal, the terminals being connected to the counting means to provide for the energization of a particular terminal dependent upon the count means for driving the paper past the terminals, and means connected to the plurality of terminals and the first incrementing means for varying the level at which the terminals are energized upon each increment in the first quantity.

3. A graph plotter, including, means for providing digital increments in a first quantity, means for providing digital increments in a second quantity related to the first quantity, means for providing a count of the increments in the second quantity, an electrosensitive paper, a plurality of terminals positioned in contiguous relationship to the paper at progressive intervals along a first axis of the paper and connected to the counting means to provide indications of successive integers in the value of the second quantity, means for energizing a terminal in the plurality dependent upon the indications provided by the counting means, means for driving the paper past the terminals, and means connected between the first incrementing means and the plurality of terminals for varying the energization of the terminals upon each increment in the first quantity.

4. A graph plotter, including, means for providing digital increments in a first quantity, means for providing digital increments in a second quantity related to the first quantity, means for providing a count of the increments in the second quantity, an electrosensitive paper, a plurality of terminals disposed in contiguous relationship to the paper along a first axis to provide indications on the paper representing different values of the second quantity, each of the terminals being disposed a distance along the first axis corresponding to the numerical value that it represents, each of the terminals being connected to the counting means to become energized upon an indication by the counting means corresponding to the number that the terminal represents, means for driving the paper, and an electrical circuit connected between the plurality of terminals and the first incrementing means to provide indications of the value of the second quantity at any instant and each increment in the value of the first quantity.

5. A graph plotter, including, means for providing digital increments in a first quantity, means for providing digital increments in a second quantity related to the first quantity, means for providing a count of the increments in the second quantity, an electrosensitive paper, a plurality of terminals disposed at progressive intervals along a first axis of the paper and in contact with the paper to provide marks on the paper indicative of successive integers, each terminal being connected to the counting means to become energized upon a particular count, means for driving the paper past the terminals, and means connected between the first incrementing means and with the plurality of terminals to provide a mark indicative of each increment in the first quantity and the value of the second quantity.

6. A graph plotter, including, means for providing digital increments in a first quantity, means for providing digital increments in a second quantity related to the first quantity, means for providing a count of the increments in the second quantity, an electrosensitive paper, a plurality of terminals disposed at progressive intervals along a first axis of the paper in abutting relationship to the paper and connected to the counting means to become energized upon a count corresponding to their relative positioning along the axis so as to provide indications on the paper, means for driving the paper past the terminals, a first electrical circuit including the counting means and the plurality of terminals to produce an indication on the paper during the periods between successive counts in the second quantity and a second electrical circuit including the first incrementing means and the plurality of terminals to produce an indication upon the occurrence of each increment in the first quantity.

7. A graph plotter, including, means for providing digital increments in a first quantity, means for providing digital increments in a second quantity related to the first quantity, means for providing a count of the increments in the second quantity, an electrosensitive paper, a plurality of terminals disposed in contiguous relationship to the paper at progressive intervals along a first axis, each terminal being adapted to provide a mark on the paper to provide an indication of a different number, each of the terminals being connected to the counting means to become energized upon a count of the integer that it represents, means for driving the paper past the terminals, means for providing a first circuit of relatively high impedance during the intervals between increments in the first quantity, such circuit including the paper and the energized terminal in the plurality to provide an indication of the second quantity, and means for providing a circuit of relatively low impedance to produce on the paper a mark indicative of the increment in the first quantity and the value of the second quantity, such second circuit including the paper and the energized terminal in the plurality.

8. A graph plotter, including, means for providing digital increments in a first quantity, means for providing digital increments in a second quantity, means for providing a count of the increments in the second quantity, an electrosensitive paper, a plurality of terminals disposed in contiguous relationship to the paper to provide an indication on the paper of a particular count upon the energization of a particular terminal in the plurality, each of the terminals being connected to the counting means for becoming energized upon a count of a particular increment in the second quantity, and means for producing a change in the intensity of indications provided on the paper by the energized terminal upon the occurrence of each digital increment in the first quantity.

References Cited in the file of this patent

UNITED STATES PATENTS

| | | |
|---|---|---|
| 2,501,791 | Silverman | Mar. 28, 1950 |
| 2,639,209 | Gamarekian | May 19, 1953 |
| 2,659,650 | McDonald | Nov. 17, 1953 |